(12) United States Patent
Smith

(10) Patent No.: US 8,204,920 B2
(45) Date of Patent: Jun. 19, 2012

(54) METHOD AND SYSTEM FOR ACCESSING SOFTWARE-BASED SYSTEMS

(75) Inventor: Simon Smith, York (GB)

(73) Assignee: Mood Enterprises Ltd, Berkshire (GB)

( * ) Notice: Subject to any disclaimer, the term of this patent is extended or adjusted under 35 U.S.C. 154(b) by 495 days.

(21) Appl. No.: 10/119,058

(22) Filed: Apr. 9, 2002

(65) Prior Publication Data

US 2002/0147713 A1    Oct. 10, 2002

(30) Foreign Application Priority Data

Apr. 10, 2001 (GB) .................................. 0108913.5

(51) Int. Cl.
 G06F 12/00 (2006.01)
 G06F 17/30 (2006.01)
(52) U.S. Cl. ....................................................... 707/827
(58) Field of Classification Search ................ 707/1–10, 707/100, 200; 709/223; 719/330
 See application file for complete search history.

(56) References Cited

U.S. PATENT DOCUMENTS

| | | | |
|---|---|---|---|
| 5,652,884 A * | 7/1997 | Palevich ............................ | 713/1 |
| 5,892,947 A | 4/1999 | DeLong et al. ................. | 703/22 |
| 6,028,602 A | 2/2000 | Weidenfeller et al. ........ | 345/781 |
| 6,097,887 A | 8/2000 | Hardikar et al. .............. | 717/105 |
| 6,167,395 A | 12/2000 | Beck et al. ........................ | 707/3 |
| 6,173,297 B1 * | 1/2001 | Moon et al. .................... | 715/515 |
| 6,173,438 B1 | 1/2001 | Kodosky et al. .............. | 717/105 |
| 6,192,314 B1 | 2/2001 | Khavakh et al. .............. | 701/209 |
| 6,199,193 B1 | 3/2001 | Oyagi et al. ................... | 717/101 |
| 6,219,055 B1 | 4/2001 | Bhargava et al. ............. | 345/420 |
| 6,385,724 B1 * | 5/2002 | Beckman et al. ............. | 713/167 |
| 6,427,230 B1 * | 7/2002 | Goiffon et al. ................ | 717/108 |
| 6,430,609 B1 | 8/2002 | Dewhurst et al. ............. | 709/220 |
| 6,442,557 B1 | 8/2002 | Buteau et al. ................. | 707/102 |
| 6,442,620 B1 * | 8/2002 | Thatte et al. .................. | 719/316 |
| 6,539,379 B1 | 3/2003 | Vora et al. .......................... | 707/6 |
| 6,571,232 B1 * | 5/2003 | Goldberg et al. ................. | 707/2 |
| 6,662,355 B1 | 12/2003 | Caswell et al. ............... | 717/103 |
| 6,718,366 B2 | 4/2004 | Beck et al. .................... | 709/204 |

(Continued)

FOREIGN PATENT DOCUMENTS

EP    0749077 A2    12/1996

(Continued)

OTHER PUBLICATIONS

"Powerful business transformation partnership enabling sustainable growth in e-business" http://web.archive.org/web/20000712093414/www.tsorg .com/pressrelease.htm.*

(Continued)

*Primary Examiner* — Michael Hicks

(74) *Attorney, Agent, or Firm* — Head, Johnson & Kachigian, P.C.

(57) ABSTRACT

A method for generating a system and, the system itself, which allows the selective access to and retrieval of data from a number of data resources. The system comprises a host system via which a user can make a request for data, and with reference to the request, the host system selects, using a series of activators held therein, those data resources, referred to as target systems, which are required to be accessed. The interface between the host and target systems and the generation and display of the retrieved data is controlled so as to provide the data to the user in the contextual format.

23 Claims, 5 Drawing Sheets

U.S. PATENT DOCUMENTS

| | | |
|---|---|---|
| 6,745,382 B1 * | 6/2004 | Zothner ............... 717/107 |
| 6,774,911 B2 | 8/2004 | Hodgson et al. ............ 345/619 |
| 6,813,587 B2 * | 11/2004 | McIntyre et al. ............ 702/183 |
| 6,874,119 B2 * | 3/2005 | Macleod Beck et al. ..... 715/201 |
| 6,910,072 B2 | 6/2005 | Macleod et al. ............ 715/500 |
| 6,957,427 B1 * | 10/2005 | Wollrath et al. ............... 718/1 |
| 6,983,321 B2 | 1/2006 | Trinon et al. ............... 709/224 |
| 7,039,654 B1 | 5/2006 | Feder ........................ 707/104.1 |
| 7,120,643 B2 | 10/2006 | Dill ............................. 707/102 |
| 7,162,427 B1 | 1/2007 | Myrick et al. ................. 705/1 |
| 7,171,647 B1 * | 1/2007 | Smith et al. .................. 717/105 |
| 7,219,327 B1 * | 5/2007 | Jacobs et al. ................. 717/104 |
| 2001/0042063 A1 | 11/2001 | Ebert ........................ 345/854 |
| 2002/0032669 A1 * | 3/2002 | Smith et al. .................... 706/21 |
| 2002/0059264 A1 * | 5/2002 | Fleming et al. ............. 707/100 |
| 2002/0089550 A1 | 7/2002 | Orbanes et al. ............. 345/853 |
| 2002/0198727 A1 | 12/2002 | Ann et al. ...................... 705/1 |
| 2004/0243520 A1 * | 12/2004 | Bishop et al. .................. 705/75 |
| 2005/0021348 A1 | 1/2005 | Chan et al. ...................... 705/1 |

FOREIGN PATENT DOCUMENTS

| | | |
|---|---|---|
| EP | 0883057 | 12/1998 |
| EP | 1271380 A2 | 1/2003 |
| EP | 1280088 A2 | 1/2003 |
| WO | WO0102952 | 1/2001 |
| WO | WO0122331 | 3/2001 |

OTHER PUBLICATIONS

Export Database Derivation in Object-Oriented Wrappers. E-P. Lim, H-K Lee. 1999 Elsevier Science B.V.*

Wrapper Generation for Web Accessible Data Sources. Jean Robert Gruser et al. IEEE. 1998.*

Design and Implementation of a CORBA Query Service Accessing EXPRESS-based Data. Jurgen Sellentin et al. IEEE 1999.*

Context Knowledge Representation and Reasoning in the Context Interchange System. Springerlink. vol. 13, No. 2 / Sep. 2000. Bressan et al.*

Building intelligent Web applications using lightweight wrappers. Data & Knowledge Engineering. vol. 36, Issue 3, Mar. 2001, pp. 283-316. Sahuguet et al.*

Interoperable Services for Federations of Database Systems. M Roantree, J Kennedy, P Barclay—. . . in Databases and Information Systems (ADBIS'2001). Vilnius, 2001.*

"Powerful business transformation parnership enabling sustainable growth in e-business" http://web.archive.org/web/20000712093414/www.tsorg.com/pressrelease.thm.

Pyron, Tim, "Special Edition: Using Microsoft Project 98", Que Publishing, 1997, pp. 1033.

"Framework for Enterprise Architecture", John Zachman.

Salamander, "MooD Transformation Toolset Data Sheet", 2005.

Salamander Org. "MooD Transformation Toolset", www.mood.co.uk.2006.

Salamander, "Mood", http://web.archive.org/web/20001203010400/www.salamander-organzation.co.uk/mood.htm.2000.

Salamander, "Salamander", http://web.archive.org/web/20000303085028/http://www.tsorg.com/, 2000.

Lane, Charles; "Method for Transitioningfrom Soft Systems Methodology (SSM) Models to object Oriented Analysis (OOA), developed to support the Army Operational Architecture (AOA) and an Example of its Application", May 1999.

PCWorld, http://www.pcworld.com/downloads/file_description/0.fid, 6311,00.asp.

* cited by examiner

METHOD AND SYSTEM FOR ACCESSING SOFTWARE-BASED SYSTEMS

CROSS-REFERENCE TO RELATED APPLICATION

This is a U.S. patent application claiming priority to British Patent Application No. 0108913.5 filed 10 Apr. 2001 entitled "A Method And System For Accessing Software-Based Systems.

STATEMENT REGARDING FEDERALLY SPONSORED RESEARCH OR DEVELOPMENT (N/A)

INCORPORATION BY REFERENCE OF MATERIAL SUBMITTED ON A COMPACT DISC (N/A)

REFERENCE TO A MICROFICHE APPENDIX (N/A/)

BACKGROUND OF THE INVENTION

The invention which is the subject of the present application is to provide a method and system which allows the user of the same to access information held in an organization's database in an effective and improved manner.

The ability of an organization's personnel to access and manipulate the data that they, their customers, suppliers and partners generate in the course of their activities is a prerequisite for organizational effectiveness.

The use of process driven technologies to allow this access and manipulation is known and recent advances allow data which is gathered and stored in several systems to be made available to the user within one coherent view, placing the retrieved information in a process context for the end user. For example, the invention described in the applicant's co-pending British Patent Application No. 0018839.1 describes a method for developing a process-driven system for displaying diverse information within the context of the processes that require that information.

Several products constitute a body of prior art for this invention but which present a set of problems that this invention addresses.

A first area of technology relates to systems which are embedded within others. Applets™ Add-ins provide access to functionality from one system within another through the installation of a target system within the host system. (for example the Java™ jar technology U.S. Pat. No. 6,349,408).

A second area of technology relates to mechanisms for interaction between software-based systems. A known technology in this area is remote procedure call—a well-established mechanism whereby two systems can interact and share information at the level of protocol for communication. A further technology is that of data exchange (eg Electronic Data Interchange (EDI), Extensible Markup Language (XML), translation wrappers for e.g. legacy system access, adapters) that allow systems to meaningfully exchange information according to translation or defined protocol at the level of information.

A further technology relates to an attempt to ensure interoperability of diverse systems, typically based on object technologies. This technology involves the creation of common defined interfaces and methods of working for software components, such that a common broker can manage the communication between these (e.g. the CORBA™ request broker).

A further technology relates to the creation of shared data structures for authorised components, or agents, to present information against, giving an interaction typically aimed at problem resolution of some form, with features to support dynamic reconfiguration (see for example U.S. Pat. No. 6,334,146)

A further technology relates to populated frameworks for interaction that provide basic components with pre-defined interaction capabilities to address particular problems, giving a network similar in principle to a special case of target systems as activators (see for example U.S. Pat. No. 6,308,314)

A further technology relates to the presentation of data in target systems within a host system, where the host system is a portal, and the target systems are generally exposed through a web service interface, wrapped in html presentation (see for example the products of Plumtree™ Software).

A yet further area of technology relates to the coordination and control of a collection of systems by a central workflow or process integration engine (see for example Microsoft Corporation's BizTalk™ product, or the 'eBusiness Operating System'™ product of Asera Corporation), through the definition of a process comprising a series of steps with information flow. This technology is intended to provide for the coordination of several systems in the execution of a single process.

BRIEF SUMMARY OF THE INVENTION

The aim of the present invention is to provide a method and apparatus for accessing the data and functionality of a collection of software-based systems from other software-based systems, and including improvements in the provision of contextual access. A yet further aim is to provide the method and apparatus in a manner which provides a simpler and more powerful mechanism for creating, for example, coherent, contextual access to data and functionality derived from diverse sources, such as required by process-driven systems.

In a first aspect of the invention there is provided a method for creating a system to allow contextual access to data via access of a host data system by a user, said method comprising the following steps:

defining a host system for use by at least one user to access data, defining at least one target data system to be selectively accessed via the host system, creating an activator and specifying properties of the at least one target data system creating a wrapper to define the interfaces between the at least one target system and the host system and characteristics of operation of the activator instantiating the activator for the host system and at least one target system by adding values for the specification propertiescreating a representation of the at least one target system with regard to the host system and the user using the host system in at least one instance to access at least one target system instance in context via the activator.

Typically a target system is a data resource such as an information system containing data and/or functionality, which is represented within and manipulated from the host system.

Typically a host system is an information system that benefits from containing representations of data or functionality from a range of diverse target systems. A fully-realised host system results from an application of the method and apparatus to link it to the target systems.

Typically, an activator is created for a coherent set of target systems to be represented within the host system, and contains a specification and a wrapper. The specification specifies the data and functionality of interest from the target systems and with respect to request from the user, those target systems which need to be accessed. The wrapper contains instructions on how to interface with the host system to present this data, and how to interface with the targets systems to access this data.

In one embodiment of the invention, the wrapper contains programmable elements that control the manipulation of the target system data content from within the host system and allow the presentation of the retrieved data within a predetermined framework to the user so as to allow the user to utilize the data.

An instance is defined as a period of use of the system by a user which has a start and an end time. Thus, if a user uses the system a number of times in, for example, one day that user will be recognised as having had a number of usage instances in that day. In addition the system can experience simultaneous instances of use if a number of different users are using the system at the same time.

Typically the behavior of each activator defined by the wrapper is persistent, in that an instance of an activator, once created, persists with regard to the host system and target systems such that the activator can interact with the host system at distinct time intervals with no loss of state in accordance with rules given by the specifications. This allows a user, upon their return from a previous instance of use, to recommence the usage with the same activator, without having to start from the beginning once again.

In one embodiment of the invention the host system exposes itself to activators, allowing activators to modify the host system.

In a one embodiment, an activator can be treated as a target system, allowing an activator to work on behalf of a host system on another activator that may or may not (as defined by its wrapper) have any direct interface to the host system, and may in turn operate on other target systems, including other activators. The network of activators that results allows target systems to be accessed in the host system via several levels of abstraction, through layers of activators.

In one embodiment a target system can be a protocol that brokers access to other target systems, allowing the host system to dynamically find appropriate data and functionality from whichever target systems are available at the time of the request.

In one embodiment the activator is responsible for finding and instantiating another activator with values, allowing dynamic, extensible effects to be created. This extensible architecture, along with the use of a target system as a protocol allows descriptions to be given of unknown, diverse systems that a process-driven system might represent, and these descriptions allow a process-driven system to manipulate such systems, as and when they are available.

In one embodiment of the invention any of the target systems can be a representation of the host system, and an activator can utilize an understanding of host system data and behavior in its own actions with regards to the host system or target systems. Where the host system is a process-based system, this allows for target systems to be used within the context of a larger process, giving an implementation of the concept of process-driven system, see for example, the applicant's co-pending British Patent Application No. 00188391.1. The activator understands the business process, and makes appropriate use of the target system within this, as defined by its specification.

In one embodiment if one of the target systems is a representation of the host system, an activator can give a dynamic presentation of the host system, acting as the 'Controller' to the Target System's 'Model' and the Host System's 'View' in the 'Model View Controller' style of a product such as, for example, described in "Smalltalk-80: The Language and its Implementation; Adele Goldberg and David Robson (Addison Wesley, 1983, ISBN 0-201-11371-6".

In one embodiment any of the target systems can be a host system, with its own set of activators and target systems.

In a further aspect of the invention there is provided a system to allow user access to a plurality of data resources said data resources accessible by a user via a host system, each of said data resources identified as a target system connected to the host system, and characterized in that the system comprises at least one activator within the system, the activator selected in response to user request criteria; means for identifying the target system or systems which are to be accessed with reference to the specified properties of the target data systems, a wrapper which defines the interfaces between the target systems and the host system and to allow the user to obtain access to data retrieved from one or a number of selected target systems in a usage instance in a contextual manner.

In a yet further aspect of the invention there is provided a data access system, said system allowing access via a computer based access location by a user to a host system and via said host system to a number of data resources known as target systems, said system, in response to a user request, identifying, via information stored in the host system, those of the target systems which need to be addressed to meet the user request, and having identified said target systems, accessing the same in accordance with defined interface procedures held in the host system, accessing the required data from the target systems and transferring the same to the host system for provision to the user in a contextual and organized manner.

Typically the target systems which need to be addressed are identified by an activator; the interfaces between the host system and identified target systems are defined within a wrapper. Typically the data from the target systems is provided to the user via the host system within a frame work generated by the host system from data stored therein for each specific target system so that the retrieved data is placed in position in the framework and the host system includes stored therein those features of the target system required to allow the display of the data retrieved from the respective target system in the framework so as to be provided in a clear and usable manner via the computer terminal used by the user.

The present invention therefore provides a process-driven system which lays out processes, and gives access to helpful data and functionality as a user browses and makes requests for information so that the user believes that the information retrieved is effectively from the host system and the invention treats the location of the data and functionality as target systems, making these accessible and useful within a host system that presents other non-system-based but related material as well. Thus the user, upon making the request, allows the host system, to firstly identify and access the target systems with the required data, and arranges for the transfer of the data to the host system using defined interfaces held in the host system to ensure that the host and target system can "talk" to allow the effective transfer of data between the host system and target system. The host system also includes a frame work or specification as to the presentation of the retrieved data dependent upon the particular target system from which it came and specific requirements for the system. Thus the defined and contextual presentation of retrieved information allows the user to use the same as if the data had been directly provided by the host system.

The persistence of the system allows the user of the host system of the invention to revisit a target system via the method of the invention with that target system behaving differently, if required, because it is being accessed in a different context. The change in context might be because it is the second visit, or because the user of the host system has done something significant with regard to his target system in-between visits such as, for example, entering a new piece of data elsewhere in the host system that the target system could make use of.

As the host system created by the invention describes functionality at a high level (typically at the level of genuine business process, some of which may be supported by target system functionality, and some of which may not), a mechanism is achieved which allows the user to work with a suitable level of abstraction in the host system, allowing the link to the level of a target system to be made in several easy steps, rather than involving direct interaction.

The use of the collection of packages, or 'activators', allows each to define the permissible interface to a collection of target systems and to a host system. The target systems are those that will be useful during the operation of the host system. Each activator defines behaviors with regards to these systems in terms of data exchange, data manipulation and data presentation. The subsequent instantiation of any number of activators gives a set of active, persistent proxies for target system instances accessible from and in the context of an instance of the host system, thus allowing these target systems instances to be accessed and manipulated from within the context provided by the host system instance.

As indicated an activator can be utilized as a target system itself thus allowing a network of interacting activators to be created. The activator is typically defined in software and specifies abstractly a set of target systems, and interfaces with these systems and a host system, providing persistent, dynamic behavior with regards to these target systems within the host system.

BRIEF DESCRIPTION OF THE DRAWINGS

Specific embodiments of the invention are now described with reference to the accompanying drawings wherein.

DETAILED DESCRIPTION OF THE INVENTION

Figure 1:
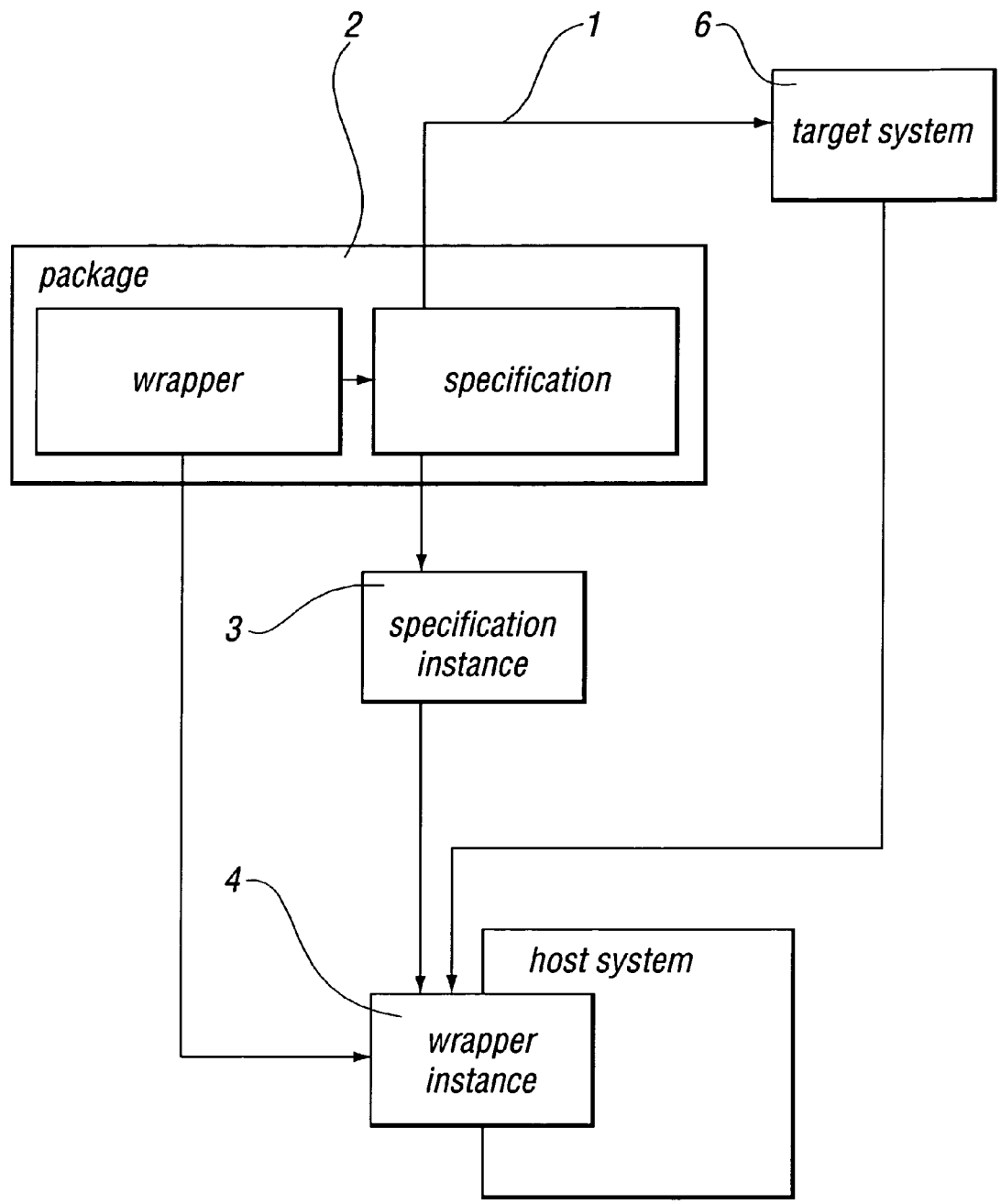
FIG. 1 illustrates in schematic fashion the method of the invention in one embodiment.

Referring now to FIG. 1 there is illustrated a schematic diagram of the key steps and components of a method, apparatus and system in accordance with the invention. The method provides the various components for the use of a host system by a user to access and obtain data from other data systems, referred to as target systems, linked to the host system. The access and manner of access and operation when access is gained is achieved via the use of activators, which set the parameters of the access to the target systems. Thus in FIG. 1 the generation of the system follows the method of creating an activator and specifying a number of target system properties 6 to which that activator is linked 1. The method then creates a wrapper which serves to define the interfaces between the target systems and host system and the characteristics and properties of the activator 2. With the wrapper complete, the activator can be instantiated or defined for the host system and the target systems by adding values for the specification properties 3 as is the wrapper 4. As a result, the target systems can be selectively accessed via the host system in a defined manner by the user of the host system for a specific request. This method can then be repeated to generate a number of activators and associated wrappers for possible different user requests so that in due course, upon a user request, the activator appropriate to that request is selected to access the target systems defined.

Figure 2:
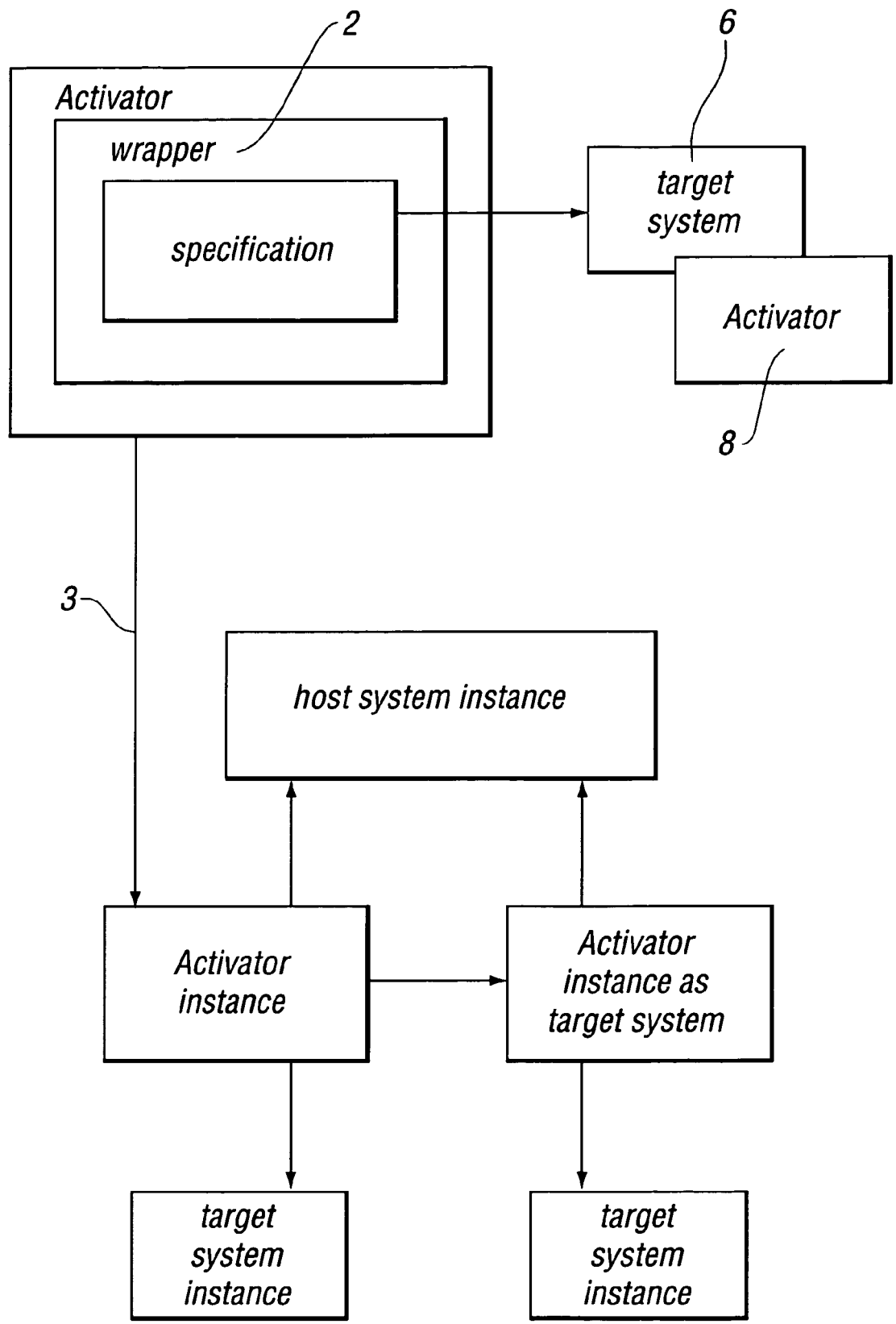
FIG. 2 illustrates the use of an activator as a target system.
Figure 3:
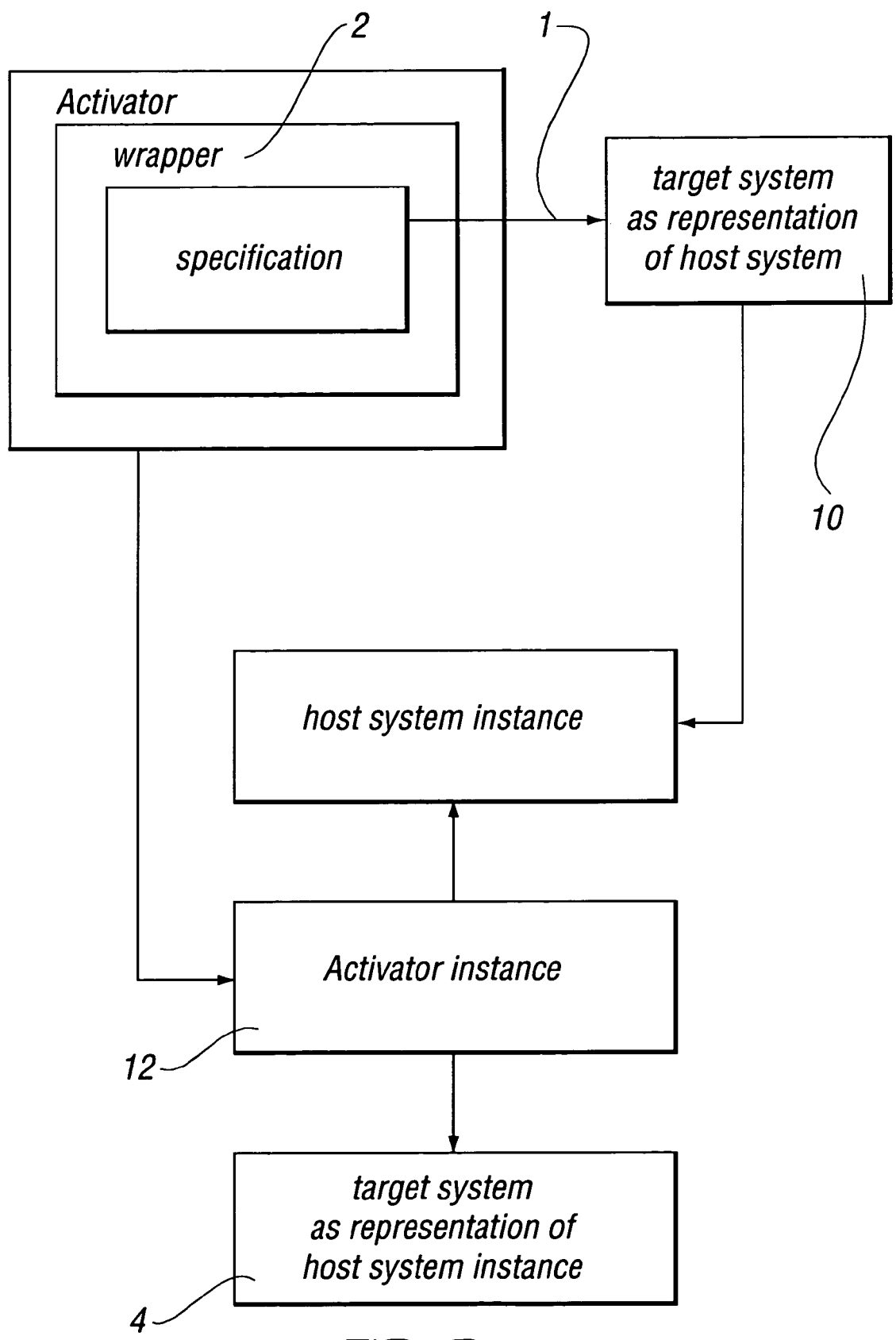
FIG. 3 illustrates the use of a target system as a representation of a host system.

It is possible for the use of the activators and target system components to be altered to provide specific system effects as is illustrated in FIGS. 2 and 3. In FIG. 2 the same four generation steps are followed as described with respect to FIG. 1 however instead of only target systems 6 being specified being provided, an activator 8 representing a target system is provided so that the said activator operates on behalf of the host system on another activator that may or may not (as defined by its wrapper) have any direct interface to the host system, and may in turn operate on other target systems, including other activators. The network of activators that results allows target systems to be accessed in the host system via several levels of abstraction, through the provision of these additional layers of activators.

In FIG. 3 a target system 10 is utilized as a representation of another host system which allows the main host system to be used to access a further target system which in itself acts a host system, said second host system having the features as herein defined with respect to the first host system. Thus an activator 12 can utilize an understanding of host system data and behavior in its own actions with regards to the host system or target systems.

A first example of implementation of the invention is now described with reference to the accompanying FIG. 4.

This first implementation concerns the development of process-driven systems, allowing meaningful access to diverse content and functionality in the context of a process-based user-interface. It shows the invention acting as the basic mechanism within a process-driven system for providing structured access to business data.

Process models are increasingly used to define best practice within a business and to communicate this to those associated with the business, with the potential benefit of enhanced business performance and the reduction in risk of failures of adherence to best practise, whether that best practice is defined within the organization or by a regulatory body.

Alongside process models describing best practice processes and the resources that these require in order to be delivered, businesses will evolve a body of documentation, guidelines, policies and rules concerning the delivery of said processes. This body constitutes the organization's knowledge resource that distinguishes its delivery of a process from another organization's delivery of the same process.

The co-pending British Patent Application No. 0018839.1 describes a process for which the term Knowledge Activation ™ has been coined as a name for the linkage of resources as described within a process model, or Knowledge Map ™, to their counterparts within this body of organizational knowledge.

The invention described in this application provides integration between a body of documentation already organized or described within a content management system within a web-generated process model system, using existing mechanisms such as XML as a basis in a tagged template specification style.

Figure 4:
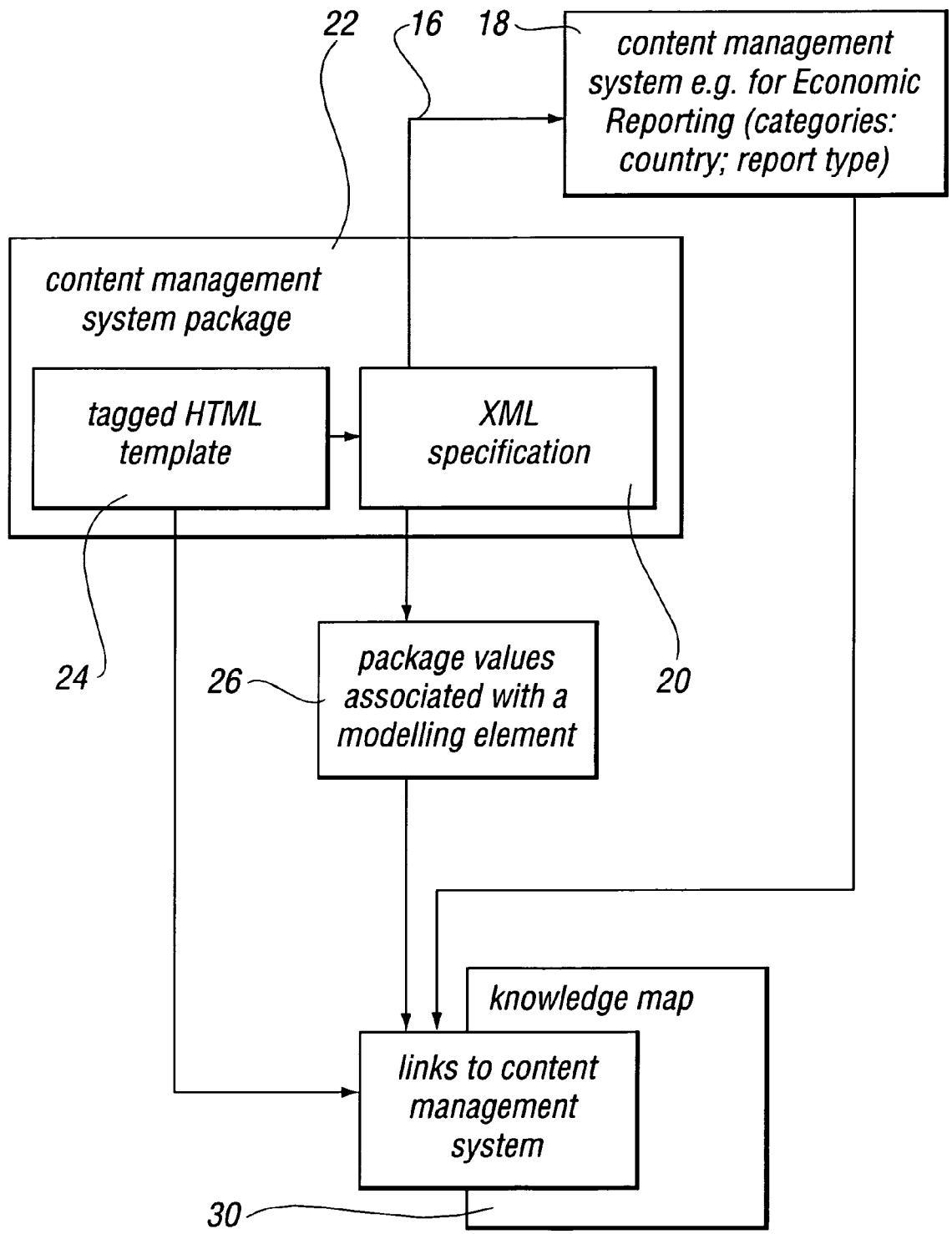
FIG. 4 illustrates a schematic diagram of an implementation of the invention.

The more specific method followed is then, with reference to FIG. 4:

Create a range of packages 16 containing XML specifications acting as an interface to files, databases and content management target systems 18. The properties and values in the specifications are represented as XML tags 20. Where these systems are able to export XML, the specification can be generated directly. The packages are defined in a format that is interpretable by a software tool. For example, for a target system 18 that is a content management system providing reports on economic activity, a fragment of a specification might be as follows:

```
<COUNTRY default="UK">
   <VALUE name="Argentina"/>
   <VALUE name="..."/>
</COUNTRY>
```

Define a wrapper 22 in the form of tagged Hyper Text Markup Language HTML) templates 24 for each package, the tags corresponding to properties defined within the specification. The tags are defined in a format interpretable by a software tool. For example, a fragment of an HTML wrapper for the specification given above might be as follows:

```
<AHREF="_ENGINE_?country=_COUNTRY_">_COUNTRY_</A>
```

Instantiate the specification within a modelling tool 26, that creates a process-driven system. For each element of the process modelling tool, a specification can be instantiated indicating the data or functionality from the target system that is to be associated with this element. The user of the modelling tool can choose or supply the value or values to be used against each property in the specification and the Modelling tool instantiates the tagged HTML template using information from the instantiated XML specification, so creating the representation of the target system within the host system The content from the content management target system 18 is then accessed by the user of the host system in a specified framework and contextual manner via the a specified context of, in this case, a knowledge map 30.

The components which are deployed in the operation of the method can now be set out in more detail.

The activator

Comprising an XML document ('specification') that specifies the elements of the target system to be represented: a collection of properties that define how data or functionality is to be taken from or written to the target system, with suggested or default values, and an HTML document ('wrapper') containing tags corresponding to properties in the specification. The tags are formatted in such a way as to be recognizable to the software tool such as the "Business Activation"™, software, and embedded within a template representation comprising HTML formatting to be used to create a representation of the specified elements of the target system within the host system The target systems An information system containing data or functionality, to be represented within the host system The host system A process-driven system comprising web-enabled process models and definitional material containing representations of data or functionality from a range of diverse target systems, linked at appropriate points in the processes. The full host system results from an application of the method to link it to the target systems.

A second implementation of the invention is now described with reference to the accompanying FIG. 5.

The second implementation also concerns the development of process-driven systems, allowing meaningful access to diverse content and functionality in the context of a process-based user-interface, showing the invention acting as the basic mechanism within a process-driven system for providing structured access to business data. This second implementation also makes use of further features of the invention.

Figure 5:
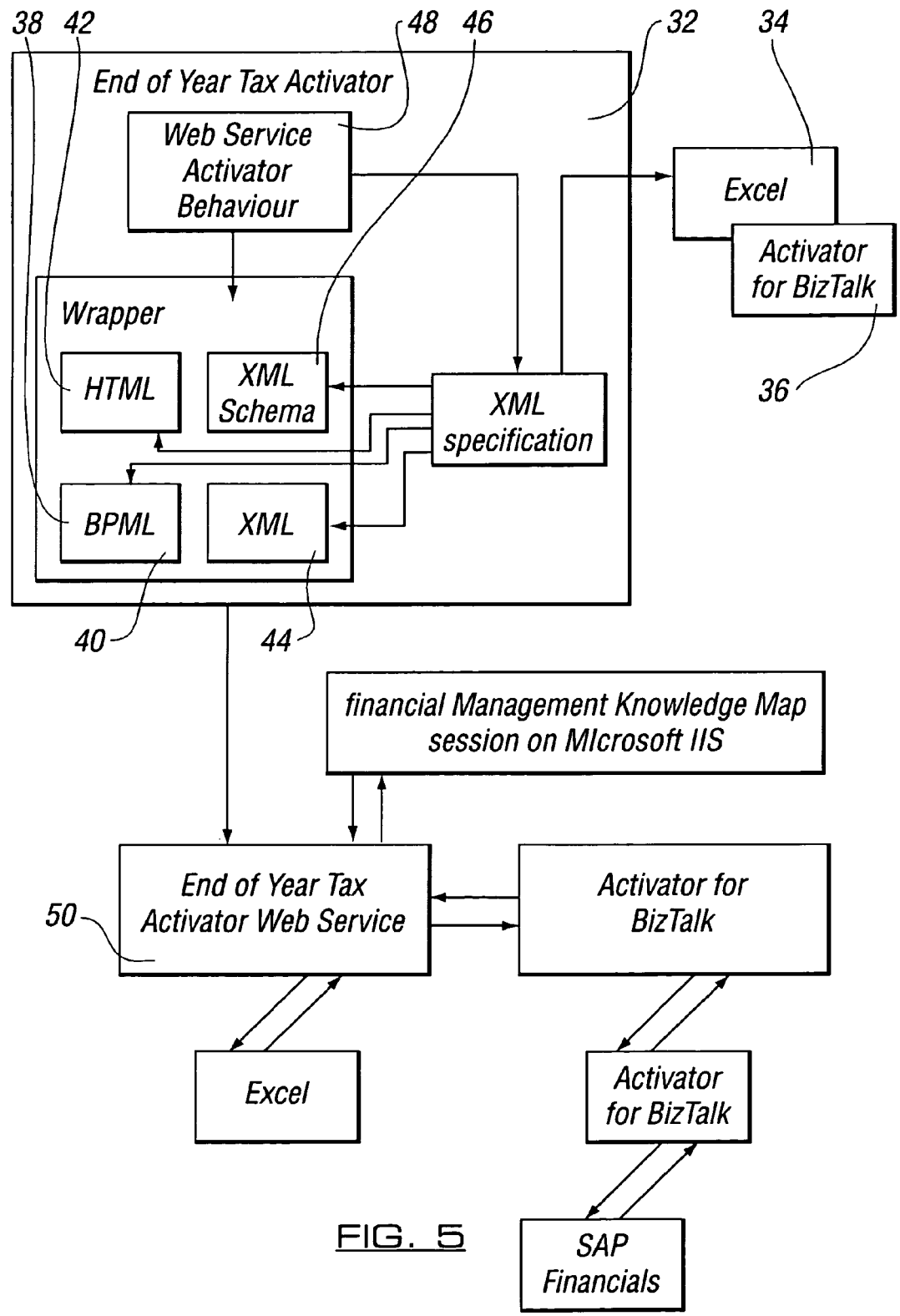
FIG. 5 illustrates a schematic diagram of a second implementation of the invention.

The more specific method followed is illustrated, with reference to a simple, specific example as laid out in FIG. 5 the aim of which is to achieve the obtaining of information for an End of Year Tax task. Thus the steps followed are as follows;

Create an activator 'End of Year Tax' 32 specifying target system requirements and properties. Two target systems are used: Microsoft Excel 34, and an extant activator 36 that integrates with the Microsoft BizTalk system A wrapper 38 is created to define the interfaces to the target systems and the users host system, comprising BPML 40, HTML 42, XML 44 and XML Schema components 46, and creating activator behavior in the form of Web Service behaviour 48.

The activator for the host system—in this case a Financial Management Knowledge Map is created using the Salamander Business Transformation Toolset™, and made available on Microsoft Corporation's IIS™ web server and target systems by adding values for the specification properties to create a sufficient representation of the target systems within the host system to allow the retrieved data to be displayed appropriately.

The host system request by the user accesses the identified target system instance(s) in context via the activator instance(s), through the mediation of the collection of interacting activators 50.

Thus, all communication between the Financial Management Knowledge Map, Activators and target system instances is through web method calls (Simple Object Access Protocol (SOAP)/XML). Activator behavior is initiated through an initial end user request made in the Financial Management Knowledge Map. The 'End of Year Tax' Activator responds to this request and gathers financial data from 'Excel' and from the BizTalk Activator, which is presented in HTML format within the Financial Management Knowledge Map. The BizTalk Activator in turn requests financial data from the BizTalk Adapter for Service Advertising Protocol (SAP), which in turn requests financial data from a SAP Financials system.

The components which are deployed in the operation of the method of this implementation can now be set out in more detail.

The activator

A set of web services containing XML specification of target systems and a variety of wrapper examples allowing communication with host and target systems The target systems Microsoft's Excel system, and an extant Activator that integrates with Microsoft's BizTalk system The host system A process-driven system comprising web-enabled process models and definitional material containing representations of data or functionality from a range of diverse target systems, linked at appropriate points in the processes. The full host system results from an application of the method to link it to the target systems.

In comparison with technology that embeds systems within others the present invention is intended for use with common target systems within an organization, onto which a view is created, rather than for use with small applications for which it might be feasible to take an entire copy of a target system and install this within the host.

Current software interaction mechanisms do not provide the concept of host system as required, in particular wrappers for alternate interfaces and support for interface presentation consistent with a host system while the present invention provides access to data in context of the host system, rather than simply interaction protocols between diverse software systems, while mechanisms that provide presentation within a host system (e.g. devices in a portal) lack the persistence and interaction of these components.

In comparison with workflow and process integration technology, the present invention addresses a different aim, concerned with the concept of a host system that provides the context for the usage of the target systems, which leads us to the concept of activators as potentially a community of interacting components, with no single point of control, giving flexibility and extensibility in deployment, and the concept of a host being a process-driven system, with a target being a model of this process-driven system.

In addition, further enhancements derive from the present invention:
   the presentation of the data from the system can be controlled through templates, allowing the look and feel of the published framework to be preserved, and allowing the data to be interwoven with information from the published framework and data from elsewhere and previously used formats.
   multiple packages may be developed for the same target system, giving alternative views onto the same content
   the packages that are available can be varied according to user privileges
   packages can contain active components for manipulating target systems within the host system
   the generic concept of package is used regardless of whether the link to be made comprises a simple search string, or an active component, giving a simple, unifying approach to a complex and diverse problem area—that of linking to diverse content While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

The invention claimed is:

1. A computer implemented method providing contextual access to data via access of a host data system by a user, said method comprising the following steps:
   defining a host system including computer hardware basis used by at least one user to access data, said computer hardware basis including a database in which data is held;
   defining at least one process model within the host data system, and defining a plurality of elements within said process model;
   defining at least one target data system to be selectively directly accessed via the user selection of an element of the process model in the host data system by selectively accessing and obtaining data directly from the target data system from the database;
   creating an activator which specifies properties of the at least one target data system, said activator including a wrapper and a specification;
   creating a wrapper having programmable elements that define interfaces between the at least one target system and said element in the process model in the host data system and which also defines the operation of the activator;
   instantiating the activator for said element in the process model in the host data system and said at least one target system by adding values for the specification properties, creating a representation of the at least one target system with regard to said element in the process model in the host data system; and
   the host data system includes in the computer hardware database, said process model to which the created representation of said at least one target data system is added and the user uses the host data system via the process model to access said at least one target system instance via the activator, by selecting an element to which the target system is linked, said activator controlling or manipulating the target data system from the host data system via the target system representation within the process model which presents data obtained from the computer hardware database to the user in a screen display, and wherein the process model is repeated for each of the elements of the process model for which a target system is required thereby generating a process model with a series of elements which can be user selected to access a specific target system linked thereto and wherein the target system representation formed in the host data system presents values and/or data obtained directly by the user selecting an element and the host data system includes a framework and/or specification as to the presentation of the retrieved target system data which is dependent upon the particular target system from which it came.

2. A method according to claim 1 wherein a specification generated for a new target system is generated by an already existing target system.

3. The method according to claim 1 wherein the activator includes control elements that allow control or manipulate the target system data content from the host data system.

4. The method according to claim 1 wherein the activator is stored in the computer hardware basis database of the host data system and persists with regard to the host data system and target systems in subsequent use of that activator.

5. The method according to claim 4 characterised in that the persistence of the activator causes the host data system when next used by the same user to commence use via the same activator from a location at which the activator was at in the previous use of the host data system.

6. The method according to claim 1 wherein said at least one target system is a protocol that brokers access to other target systems.

7. The method according to claim 1 wherein said at least one target system acts as a representation of the host data system to provide an activator to utilized the host data system data with respect to the host data system and at least one target system.

8. The method according to claim 7 wherein that the activator gives a dynamic representation of the host data system.

9. The method according to claim 1 wherein said at least one target is itself said host data system, with its own set of activators and target systems.

10. The method according to claim 1 wherein said host system is accessible to said activator, allowing the activator to modify the host system.

11. A computer implemented system providing access to a plurality of data resources, said system comprising:
data resources accessible by a user via a host data system, each of said data resources including a computer hardware basis database and identified as a target system connected to the host data system and represented on the host system as part of a process model, said process model including a plurality of elements;
at least one activator selected in response to user request criteria which specifies properties of the target data system;
identifying via information in the host data system, the target system to be accessed with reference to the specified properties of the target data systems;
a wrapper having programmable elements which defines the interfaces between the target data systems and the elements of the process model of the host data system and accesses data retrieved from computer hardware databases or a number of target systems selected with reference to the process model in a contextual manner, the host data system also being accessible to said activator, thereby performing control or manipulation of the target system from the host data system via the target system representation within the process model to present data obtained from one or more computer hardware databases to the user via a screen display; and
wherein the plurality of elements in the process model are each linked to a defined target system via the performance of the appropriate activator and wrapper for that element and the target system representation formed in the host data system presents values and/or data obtained directly by the user selecting an element and the host data system includes a frame work and/or specification as to the presentation of the retrieved target system data which is dependent upon the particular target system from which it came.

12. The system according to claim 11 wherein for each usage instance, the user request for each usage instance is analyzed and the appropriate target system or systems identified and accessed via the appropriate activator.

13. The system according to claim 11 wherein the activator includes control elements that allow control or manipulate the target system data content from the host system.

14. The system according to claim 11 wherein upon an instance of use by a user who has previously used the system for the same or a similar request the same activator is selected, said activator having stored data indicative of a criteria of the previous instance of use and said data persists for the new instance of use so as to preventing the user from having to start the usage from the same starting point as the previous use.

15. The system according to claim 14 wherein the persistence of the activator reduces user input when the host data system is next used by the same user to start commencement of use via the same activator from the location at which the activator was at in the previous use of the host data system.

16. The system according to claim 11 wherein that the host data system is accessible to the activator, causing the activator to modify the host system.

17. A system according to claim 11 wherein upon selection of a first activator, that activator searches for another activator in the host data system and when another activator is found instantiates the said another activator with values to provide the said another activator to be used in the host data system.

18. The system according to claim 11 wherein said at least one target system acts as a representation of the host data system to provide an activator to utilize the host data system data with respect to the host system and at least one target system.

19. A method for using a data access system;
said method comprising the following steps:
user accessing via a computer based access location a host data system and via said host data system further accessing to a number of data resources known as target systems, each of said target systems graphically represented within a process model on said host data system, said process model including a plurality of user selectable elements and each of said target systems being accessible via an element of the process model;
in response to a user request via an element, said data access system identifying, via information stored in the host data system, the target data systems which need to be addressed to meet the user requests; and
having identified said target systems, accessing the target data systems in accordance with defined interface procedures held in the host data system;
directly accessing the required data from the target systems and transferring the data to the host data system in a contextual and organised manner thereby controlling or manipulating the target system from the host data system via the target system representation within said process model using said activator, wherein the target system representation formed presents values and/or data obtained directly by the user selecting an element and the host data system includes a frame work and/or specification as to the presentation of the retrieved target system data which is dependent upon the particular target system from which it came.

20. The data access method according to claim 19 wherein said activator identifies the specific target systems which need to be referred to.

21. The data access method according to claim 19 wherein the defined procedures between the host system and identified target systems are defined within a wrapper.

22. The data access method according to claim 19 wherein the data from the target systems is provided to the user via the host data system within a framework generated by the host data system from data stored therein resulting in the retrieved data being placed in said framework.

23. The data access method according to claim 22 wherein that the host data system includes stored therein those features of the target system required to display data retrieved from the respective target system in the framework provided via a computer terminal used by the user.

* * * * *